United States Patent Office 2,776,324
Patented Jan. 1, 1957

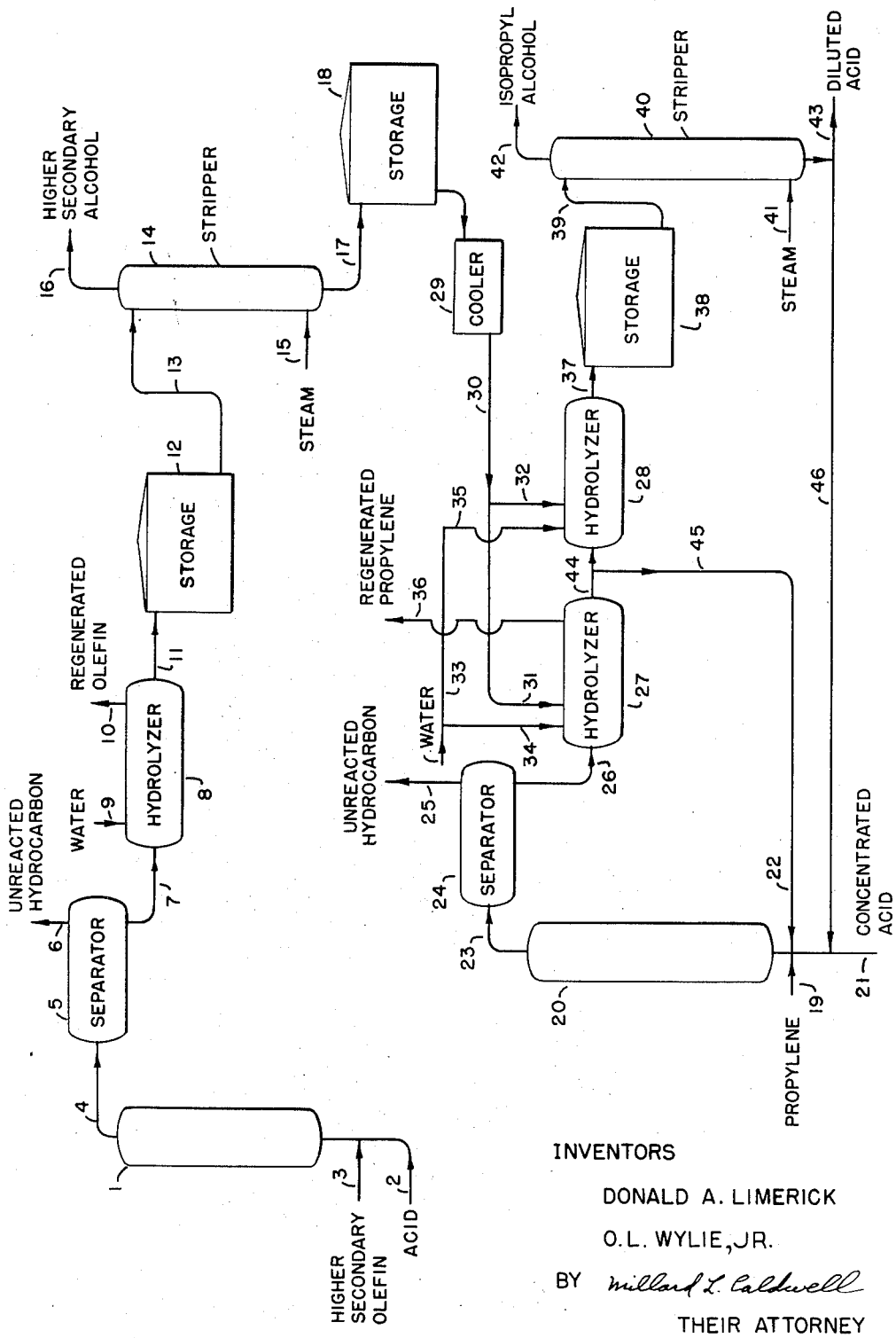

2,776,324

HYDROLYSIS OF ISOPROPYL ESTERS WITH ACID FROM HIGHER ALCOHOL HYDROLYSATE

Donald A. Limerick, Long Beach, Calif., and Oran L. Wylie, Jr., Jefferson Parish, La., assignors to Shell Development Company, New York, N. Y., a corporation of Delaware Application January 11, 1955, Serial No. 481,102

12 Claims. (Cl. 260—639)

This invention relates to the manufacture of secondary alcohols by reacting the corresponding olefins with an inorganic acid. It deals with a new unitary process of this type whereby isopropyl alcohol can be produced together with a higher secondary alcohol in a more efficient and economical manner.

It is known that secondary alcohols can be produced by absorbing olefins of three or more carbon atoms per molecule having the double bond between carbon atoms, to each of which at least one hydrogen atom is directly attached in a strong polybasic inorganic acid to form secondary alkyl esters, and hydrolyzing the esters. Isopropyl and secondary butyl alcohols are produced in this way on a large scale from propylene and normal butylene containing fractions of petroleum cracking products. A major source of expense in this method of producing secondary alcohols is the cost of reconcentrating the dilute inorganic acid obtained after recovery of the alcohol from the hydrolyzed absorption product. It has been proposed to reduce this expense when producing isopropyl alcohol by using acid of relatively low concentration for absorbing the propylene and carrying out the hydrolysis and alcohol recovery with amounts of added water which do not reduce the final acid concentration below that employed in the absorption. This method of operation is not feasible in the case of the higher secondary alcohols because these require greater dilution during the hydrolysis and alcohol recovery steps in order to avoid excessive loss of product. Even for the production of isopropyl alcohol, the proposed method has certain disadvantages, particularly in requiring lower rates of plant production in existing plants than when acid of high concentration is used for absorbing the propylene.

An important object of the present invention is to reduce the cost of acid reconcentration when producing higher secondary alcohols from the corresponding olefins. It is an object of the invention to provide a process of producing isopropyl and a higher secondary alcohol in which residual spent acid of relatively high concentration is obtained without detrimental loss of product. Another object is the provision of a process of this type in which other operating economies can also be realized. A particular object is the production of isopropyl and at least one higher secondary alcohol at high production rates by separately absorbing the corresponding olefins in acid of high concentration and hydrolyzing the absorption products, and recovering acid of a higher concentration which requires less reconcentration for reuse in the process. A special object is the more efficient production of isopropyl and secondary butyl alcohols from propane-propylene and butane-butylene fractions of hydrocarbon cracking products. Still other objects and advantages of the new integrated process will be apparent from the following description.

In accordance with the invention the foregoing objects are achieved by carrying out the production of isopropyl and at least one higher secondary alcohol as a unitary process comprising the following cooperating steps. A higher secondary olefin, that is, an olefin of at least four carbon atoms having at least one hydrogen atom linked to each of the doubly bonded carbon atoms, is absorbed in and reacted with a strong inorganic polybasic acid of suitable concentration. The absorption product containing secondary alkyl acid esters of the inorganic acid is hydrolyzed to release the corresponding higher secondary alcohol by adding water and maintaining the mixture at a suitable controlled temperature until the desired conversion of alkyl ester has been obtained. The higher secondary alcohol is then separated from the acid. In hydrolysis and recovery the concentration of the acid must be controlled so as to avoid undesirable loss of alcohol such as occurs when the acid concentration is too high and conditions are regulated so that the final concentration of the recovered acid is not more than about 45%.

Propylene is separately reacted with the strong inorganic polybasic acid to obtain an absorption product which is then hydrolyzed in the presence of added dilute recovered acid from the higher secondary alcohol recovery step of the process described above. Due to the greater stability of the resulting isopropyl alcohol, the hydrolysis and separation of the alcohol can in this case be carried out so that the final concentration of the recovered acid is between 50%; and about 70% concentration. The acid thus recovered is of higher overall concentration than is obtainable by prior methods. It can be reconcentrated at lower cost for reuse in absorbing the starting olefins or for other purposes, or it can be utilized in other ways more advantageously than the more dilute acid heretofore obtained.

Depending upon the relative scales of production of isopropyl alcohol and higher secondary alcohol, all or only a portion of the dilute recovered acid from the higher alcohol synthesis will be used in the hydrolysis of the propylene absorption product. In any case, however, the new method of operation has the important advantage of giving an overall increase in the average residual acid concentration. This makes possible a substantial increase in the capacity of the acid reconcentrating equipment. The new method also has the advantage of increasing the rate of hydrolysis of the isopropyl esters, making possible a greater rate of throughput in apparatus of a given size while achieving a higher degree of hydrolysis. Connected with this is a reduction in the amount of propylene regenerated during the hydrolysis, due to the fact that reversion to propylene decreases as the extent of the hydrolysis increases. The heat of hydrolysis of the isopropyl esters is also reduced as a result of the use of dilute acid from higher alcohol production instead of water for dilution in this step of the new process. This facilitates control and reduces the cost of this hydrolysis step. These advantages are realized without any sacrifice in the quality of the secondary alcohols which are the final products.

The reactions of the propylene and the higher secondary olefin or olefins with the chosen strong polybasic inorganic acid can be carried out in any suitable manner. Suitable methods are known for carrying out these steps of the new process. One advantageous method comprises intimately contacting the olefin in the liquid phase with the acid under controlled conditions until the desired absorption is achieved. However, especially with the lower secondary olefins, it is feasible to carry out the absorption by countercurrent contact of the olefin in the gaseous state with the chosen acid. The preferred acids are sulfuric or phosphoric acids, or mixtures of these acids.

As previously pointed out, the absorption of propylene can be carried out with acid of relatively low concentration such as can be recovered directly from the hydrolysis of the propylene absorption product. Sulfuric or phosphoric acid of about 60% to about 70% strength is particularly suitable for such operation. However, the propylene can be absorbed in stronger acid, for instance, acid of 70% to about 100% concentration, sulfuric acid of about 90% to about 99% strength having advantages under some circumstances, although a lower acid concentration is preferred in many cases due to the decreased equipment requirements and lower operating expense involved in reconcentrating the acid to lower concentrations. It is usually desirable to use about 0.5 to 2 moles of acid per mole of olefin in the absorption. Absorption temperatures in the range of about 15° C. to about 70° C. can generally be employed. The temperature, acid concentration and time of contact are interdependent variables which should be regulated so that the desired reaction takes place without excessive polymerization or other undesirable side reactions. Thus, with acid of higher concentration lower absorption temperatures will be preferable. As a rule, contact times of the order of about 5 to about 150 minutes will provide adequate reaction. Especially when using as the absorption medium acid having a concentration in the lower portion of the indicated range it will usually be desirable to carry out the absorption in stages and most preferably countercurrently. The preferred conditions for absorption of propylene in 90% to 99% sulfuric acid are a mole ratio of acid to olefin of about 0.6:1 to 0.75:1, a temperature of about 35° C. to 65° C., and a contact time of about 5 to about 30 minutes.

Generally it is preferred to use acid of about 75% to about 100% concentration, most preferably about 90% to 99% concentration, for the absorption of the higher secondary olefin or mixture of higher secondary olefins used. It is desirable as a rule to maintain somewhat lower absorption temperatures for these olefins than need to be employed for reacting propylene with acid of the same concentration. Thus, secondary olefins of 4 to 8 carbon atoms, for example, are preferably reacted with about 90% to 99% sulfuric acid at about 15° C. to about 35° C., using about 0.7 to about 1.0 mole of acid per mole of olefin, and a contact time in the range of about 5 to about 45 minutes.

Examples of higher secondary olefins which can be successfully used in the new process are butene-1, butene-2, pentene-1, pentene-2, 2-methylbutene-3, the normal hexenes, 2-methylpentene-4, and like olefins of 4 to 18 carbon atoms. These olefins can be used individually or as mixtures of two or more such olefins having the same or different numbers of carbon atoms per molecule. A convenient source of suitable olefins is the fractions of hydrocarbon cracking products made up predominantly of olefins and paraffins having the same number of carbon atoms per molecule. Thus, one can use a propane-propylene fraction and a higher fraction, such as a pentane-amylene fraction or a hexane-hexylene fraction, which has been treated to substantially remove tertiary olefins. Selective extraction and selective polymerization, for instance, are suitable methods of removing tertiary olefins from the higher secondary olefins used in the new process.

After separate reaction of the starting olefins with the chosen acid, unreacted hydrocarbons are removed from the acid phase of the reaction product and the acid product is hydrolyzed. As previously pointed out, the product from the reaction of the higher secondary olefins is diluted with water to effect the desired hydrolysis. The hydrolysis can be carried out in any suitable manner. Sufficient water should, of course, be added to bring about the desired conversion of the alkyl esters to the corresponding higher secondary alcohol. It is preferred to effect at least partial hydrolysis at a relatively low temperature of the order of about 25° C. to 45° C., with the mixture diluted to a final acid concentration not greater than about 70% on an organic-free basis. The hydrolysis can then be completed at a higher temperature under conditions controlled so that the final concentration of the recovered acid is not greater than 45% and preferably is between about 30% and 45%. For instance, the hydrolysis can be completed advantageously by a steam distillation in which the higher secondary alcohol is simultaneously separated from the acid. In this way high yields of higher secondary alcohol can be readily obtained. Other methods of operation can, however, be employed. Thus, the hydrolysis can be carried substantially to completion by agitating the diluted acid product at a temperature below the boiling point of the alcohol or the existing pressures which can be ordinary atmospheric or higher or lower pressures. The alcohol can then be separated from the diluted acid of less than 45% concentration in any suitable way. Still other ways of carrying out this hydrolysis and the subsequent separation of the higher secondary alcohol from the dilute acid can be used.

The hydrolysis of the acid mixture from the propylene reaction can be carried out in the same way as that of the higher secondary olefin reaction products described above, but using dilute acid recovered from the higher secondary alcohol to supply at least a substantial part of the dilution water.

Preferably sufficient of such dilute recovered acid is added to supply at least 30% of the dilution water used in hydrolyzing the isopropyl esters, and more preferably between about 40% and about 100% of such dilution water. Most advantageously, the propylene reaction product is diluted both with water and with dilute acid recovered from the higher secondary alcohol in amounts which result in a final acid concentration of between about 50% and 70%. A particularly suitable procedure is to effect partial hydrolysis at a temperature between about 45° C. and about 55° C. with sufficient of such dilute recovered acid and water to reduce the acid concentration to about 60% to about 75% on an organic-free basis. The hydrolysis is afterward completed by steam stripping the partially hydrolyzed mixture so as to recover a final acid of about 50% to about 70% strength. The dilution can be carried out with separate addition of water and the dilute recovered acid from the higher secondary alcohol, which can be added in either order, or both can be added together. The dilution can be done all at once or in stages as the hydrolysis progresses. There are advantages in carrying out the dilution in a plurality of hydrolysis stages, and it is preferred when using water in conjunction with the dilute recovered acid from the higher secondary alcohol to use two stages and to dilute with the recovered acid in the first hydrolysis stage and to complete the dilution by adding the water to the second hydrolysis stage.

The attached drawing is a flow-sheet showing diagrammatically, and not to scale, one assemblage of apparatus which is suitable for carrying out the new process in one of its various modifications. In the drawing, 1 represents a reactor in which a strong polybasic acid supplied by line 2 is contacted with a hydrocarbon fraction containing a secondary olefin of four or more carbon atoms per molecule supplied via line 3. In reactor 1 the olefin and acid are intimately contacted at a temperature controlled by means not shown, at which substantial reaction of the olefin with the acid takes place with absorption of the olefin by the acid and formation of alkyl esters. The reacted mixture passes out of the reactor by line 4 leading to separator 5 in which the unreacted hydrocarbon, which will usually be substantially non-olefinic hydrocarbons, is separated from the acid phase and removed by line 6. The acid reaction product is taken off by line 7 and conducted to a hydrolyzer 8 in which it is diluted by water added by line 9. Partial hydrolysis of the alkyl esters, especially of the polyalkyl esters, is carried out in hydrolyzer 8 which is provided with an outlet line 10 through which any olefins regenerated during the hydrolysis can be removed and returned by means not shown to reactor 1, or otherwise disposed of. The partially hydrolyzed acid product is withdrawn by line 11 to a storage tank 12 from which it is supplied by line 13 to stripping still 14 for completion of the hydrolysis of the esters while distilling off the higher secondary alcohol produced with steam supplied by line 15. The alcohol product is taken off by line 16 while the recovered acid, which will be of less than 45% concentration as a result of dilution in hydrolyzer 8 and stripper 14, is removed as bottom product by line 17 to storage tank 18.

Propylene-containing hydrocarbon supplied by line 19 is fed to reactor 20 in which it contacts strong polybasic inorganic acid supplied by line 21. The reacted mixture comprising an acid phase containing isopropyl esters and an unreacted hydrocarbon phase passes out of reactor 20 by line 23 to separator 24 from which the unreacted hydrocarbon phase is withdrawn by line 25, while the acid phase is taken off by line 26 and fed to hydrolyzers 27 and 28. These hydrolyzers, like hydrolyzer 8, are provided with temperature controlling means such as cooling coils, not shown. In the hydrolyzers the isopropyl ester-containing acid mixture is diluted with acid from storage tank 18 which has been cooled in cooler 29, from which it is removed by line 30 which connects via lines 31 and 32 with hydrolyzers 27 and 28, respectively. These hydrolyzers are also connected by line 33 and lines 34 and 35, respectively, to a supply of dilution water, which, like the acid from cooler 29, can be fed to either or both of these hydrolyzers. Hydrolyzer 27 is fitted with an outlet line 36 through which any propylene regenerated during the first stage of the hydrolysis can be withdrawn for return to reactor 20. After passage in series through hydrolyzers 27 and 28, the partially hydrolyzed mixture is conducted by line 37 to storage tank 38. From this tank the mixture is taken off by line 39 to stripping still 40 in which it is distilled with steam supplied by line 41 to complete the hydrolysis of the isopropyl esters and take off isopropyl alcohol overhead by line 42. The final acid of about 50% to 65% concentration is taken off by line 43, as a product of higher overall concentration than is obtainable without use of the acid from line 30 in the isopropyl ester hydrolysis.

Using the method of the drawing as above described, a 30-day test of the new process was carried out. Sulfuric acid of 98% concentration was reacted with a normal butylene-butane mixture averaging about 3.2% isobutylene and 52.6% normal butylenes, using an average acid to olefin mole ratio of 0.92 and a reaction temperature of about 24° C. The acid phase of the reacted mixture was partially hydrolyzed at 30°–33° C. with dilution with water to 65.9% H₂SO₄ on a hydrocarbon-free basis. The product was stripped with steam to remove the secondary butyl alcohol produced from dilute sulfuric acid of about 42% average concentration recovered at the rate of 12,130 lbs. per hour. Simultaneously, a propane-propylene fraction containing 44.8% by weight of propylene was reacted with 98% sulfuric acid at about 48° C., using an acid to olefin mole ratio of 0.65. The acid phase of this reaction product had an average analysis of about 58.3% by weight of diisopropyl sulfate, 33.3% of isopropyl hydrogen sulfate, 4.3% of sulfuric acid, 1.8% of unreacted propylene and 1.2% of diisopropyl ether, the remainder being smaller amounts of alcohol, water, polymer, etc. This product was partially hydrolyzed at 53°–54° C., diluting first with 13.8% of water based on the total weight of the acid phase, and then with the 42% sulfuric acid solution recovered from the secondary butyl alcohol, the acid solution supplying 67.5% of the dilution water thus added. The partial hydrolysis product contained 15.4% isopropyl hydrogen sulfate, 37.8% of sulfuric acid, 26.6% of isopropyl alcohol, and 1.7% of diisopropyl ether. This mixture was steam stripped to take off crude aqueous isopropyl alcohol overhead from 55% sulfuric acid bottom product recovered at the rate of 35,700 lbs. per hour. The production of secondary butyl alcohol was at the rate of 2,500,000 lbs. per month based on a stream factor of 0.96 and with an average consumption of 0.91 lb. of butylene per lb. of secondary butyl alcohol, while the isopropyl alcohol production was at the rate of 8,930,000 lbs. per month at the same stream factor and an average of 0.80 lb. of propylene per lb. of isopropyl alcohol.

A comparative run was carried out under the same operating conditions using conventional dilution with water alone for the hydrolysis of the acid phase of the propylene reaction product. Instead of diluting this acid phase with the 42% acid recovered in the secondary butyl alcohol distillation, 17.3% of water was added. Thus, the total water dilution was 31% by weight of the acid phase in this partial hydrolysis step. In this way exactly the same acid concentration on a hydrocarbon-free basis was maintained during hydrolysis as had been employed in the foregoing operations according to the invention. This resulted in the recovery of 12,130 lbs. per hour of 42% sulfuric acid from the secondary butyl alcohol and 26,450 lbs. per hour of 55% sulfuric acid from the isopropyl alcohol. Reconcentration of this acid to the same strength as that obtained in the new process requires the removal of 2,880 lbs. of water per hour, or an increase of more than 25% in evaporator capacity when reconcentrating to 80% strength, for example.

The increased hydrolysis rate obtainable in the partial hydrolysis step of the new process is shown by the following figures for the hydrolysis of a propylene-sulfuric acid reaction product at approximately the same composition as was produced in the foregoing test. The hydrolyses were carried out at 55° C. with sufficient added water to dilute the acid phase of the reaction product to 65% sulfuric acid on an organic-free basis. The single-stage dilutions were carried out with water alone in one case, and in the other case with 40% sulfuric acid recovered from the production of secondary butyl alcohol as previously described and water in such proportions that the recovered acid supplied 79% of the dilution water.

| Hydrolysis Time | Weight Percent Free Isopropyl Alcohol Based Upon the Total Potential Isopropyl Alcohol | |
|---|---|---|
| | Hydrolysis with Water Alone | Hydrolysis with Recovered Acid from Secondary Butyl Alcohol Production |
| 15 min | 6 | 29 |
| 45 min | 24 | 65 |
| 60 min | 38 | 70 |
| 80 min | 53 | 75 |
| 110 min | 61 | 77 |
| 160 min | 69 | |
| 170 min | | 79.5 |
| 230 min | 72 | 80 |
| 300 min | 74 | 80 |
| 360 min | 75 | 80.5 |

Since 70%–75% hydrolysis prior to steam stripping is usually entirely adequate, it will be seen that the new method permits material savings in hydrolysis time.

Reduced reversion of isopropyl sulfates to propylene is another advantage of the new method. Comparative tests of hydrolysis of propylene absorption products at 55° C., with dilution to 65% based on organic-free sulfuric acid, showed that the weight percent of total potential isopropyl alcohol reverted to propylene was 18% greater when the hydrolysis was carried out with water alone than when recovered sulfuric acid of 42% concentration from secondary butyl alcohol production was used to supply the dilution water for the hydrolysis.

Similar advantages are obtained when acid of 35% to 45% concentration from the similar production of secondary amyl alcohol is used in place of the acid from secondary butyl alcohol production employed in the foregoing tests.

The process is capable of considerable variation. One modification which offers advantages is shown in the drawing. According to this procedure, the partial hydrolysis of the acid phase of the propylene reaction product is carried out in at least two stages with addition of the recovered dilute acid from the higher secondary alcohol being made chiefly in the first hydrolysis stage. The remaining required dilution with water is added in the following hydrolysis stage or stages. Thus, line 32 is closed or partially closed, and dilute acid from cooler 29 is fed by lines 30 and 31 chiefly to hydrolyzer 27. Line 34 is closed and water is supplied by lines 33 and 35 to hydrolyzer 28 only. The dilution in hydrolyzer 27 is controlled so as to maintain the concentration of the acid in the mixture between about 80% and about 90% on an organic-free basis. The product removed by line 44 is fed in part to hydrolyzer 28 in which it is further diluted to about 60% to 70% concentration of acid on an organic-free basis. The remainder of the product of the first hydrolysis stage is taken off by line 45 and fed to line 22. It is admixed with acid of higher concentration supplied via line 21 and the mixture is used for reaction with the incoming propylene in reactor 20.

As an example of operation in accordance with this modification, propylene is reacted with a blend of 98% fresh sulfuric acid introduced by line 21 and partially hydrolyzed mixture from hydrolyzer 27 having a sulfuric acid concentration on an organic-free basis of 85%. The 98% acid is added in the proportion required to bring the concentration of sulfuric acid in the blend up to 95% on a hydrocarbon-free basis. The remaining product from hydrolyzer 27 is passed to hydrolyzer 28 in which it is diluted with water to reduce the sulfuric acid concentration to about 65% on an organic-free basis. The hydrolyzers are maintained at 49° C. and the hydrolysis time is adjusted to provide the same degree of hydrolysis as in the previously described test. This method of operation gives all the advantages of the previously described method and, in addition, reduces the amount of 98% acid which must be supplied to the system.

Another modification of the process is especially advantageous when using sulfuric acid of about 60% to about 70%, most preferably about 65% to 70%, concentration for the absorption of the propylene. In this method of operation only that portion of the recovered acid corresponding to that supplied by line 2 is withdrawn by line 43 as diluted acid. The remainder is recycled by lines 46 and 21 for use in absorbing further amounts of propylene without addition of fresh acid other than such as may be required from time to time for making up mechanical losses. Longer times of contact and, hence, lower throughput rates for reactors of a given size are necessary in this case due to the lower concentration of the acid. However, this modification makes it feasible to operate successfully with the reconcentration of only the acid required for absorption of the higher secondary olefin. In this reconcentration important savings are realized due to the fact that the acid to be concentrated is 60% to 70% acid instead of the usual 30% to 45% acid.

Still other changes can be made in the invention which is not limited to the examples given by way of illustration nor by any theory proposed in explanation of the improved results which are obtained.

We claim as our invention:

1. In a process of producing isopropyl alcohol and at least one higher secondary alcohol from the corresponding olefins by separately absorbing propylene and a higher secondary olefin in strong polybasic inorganic acid, separately hydrolyzing the resulting alkyl esters and recovering the secondary alcohols thus produced from the acid, the improvement which comprises regulating the dilution during said hydrolysis and alcohol recovery operations so as to maintain the concentration of dilute residual acid from the isopropyl alcohol production within the range of about 50% to 70% and the concentration of the dilute residual acid from production of said higher secondary alcohol at a lower concentration, and adding sufficient of said dilute residual acid of lower concentration to said absorption product of propylene in strong acid during hydrolysis thereof to supply at least 30% of the dilution water for said hydrolysis whereby the overall concentration of residual acid obtained in the process is increased.

2. A process in accordance with claim 1 wherein said higher secondary olefin is absorbed in acid of about 80% to 100% concentration and the absorption product is diluted with sufficient water during the hydrolysis and higher secondary alcohol recovery steps to give a residual acid of about 30% to 45% concentration.

3. In a process of producing isopropyl alcohol and at least one higher secondary alcohol from the corresponding olefins by separately absorbing propylene and a higher secondary olefin in strong polybasic inorganic acid, separately hydrolyzing the resulting alkyl esters and recovering the secondary alcohols thus produced from the acid, the improvement which comprises controlling said hydrolysis and alcohol recovery operations so as to maintain the concentration of dilute residual acid from the isopropyl alcohol production within the range of about 50% to 70% and the concentration of the dilute residual acid from production of said higher secondary alcohol at a lower concentration in the range of about 30% to 45% by absorbing said higher secondary olefin in acid of about 80% to 100% concentration, diluting the absorption product during the hydrolysis and higher alcohol recovery steps to give a residual acid of about 30% to 45% concentration and adding sufficient of said dilute residual acid of about 30% to 45% concentration to the propylene absorption product to supply at least 30% of the dilute water applied in hydrolysis thereof whereby the overall concentration of residual acid obtained in the process is increased.

4. In a process of producing isopropyl alcohol and at least one higher secondary alcohol from the corresponding olefins by separately absorbing propylene and a higher secondary olefin in strong polybasic inorganic acid of about 80% to about 100% concentration, separately hydrolyzing the resulting alkyl esters and recovering the secondary alcohols thus produced from diluted solutions of the acid, the improvement which comprises diluting the absorption product of said higher secondary olefin with sufficient water to produce a diluted acid of 30% to 45% concentration after recovery of the higher secondary alcohol, adding water and said 30% to 45% acid to the propylene absorption product in proportions such that said 30% to 45% acid supplies at least 30% of the dilution water for the hydrolysis, partially hydrolyzing the thus diluted propylene absorption product, and steam stripping the hydrolysis product to take off isopropyl alcohol from an acid solution of about 50% to 70% concentration.

5. A process in accordance with claim 4 wherein the propylene absorption product is first diluted and partially hydrolyzed with sufficient of said 30% to 45% acid to reduce the acid concentration to about 75% to about 85% on a hydrocarbon-free basis after which water is added and the mixture is further hydrolyzed.

6. A process of producing isopropyl and secondary butyl alcohols which comprises absorbing normal butylene in concentrated sulfuric acid, diluting the absorption product with water, hydrolyzing the diluted absorption product, separating secondary butyl alcohol from resulting spent sulfuric acid of less than 50% concentration, separately absorbing propylene in concentrated sulfuric acid, adding said recovered sulfuric acid of less than 50% concentration to the proylene absorption product in an amount sufficient to supply at least 30% of the water applied in the hydrolysis thereof, hydrolyzing the mixture and recovering isopropyl alcohol while controlling the proportions to produce sulfuric acid of 50% to 70% concentration as the residual acid from the process.

7. A process in accordance with claim 6 wherein sulfuric acid of 35% to 45% concentration recovered from the secondary butyl alcohol is added to the propylene absorption product in an amount to supply at least 30% of the dilution water employed in the hydrolysis thereof.

8. A process in accordance with claim 7 wherein the propylene absorption product is diluted with water after said addition of the 35% to 45% sulfuric acid recovered from the secondary butyl alcohol.

9. A process in accordance with claim 7 wherein the propylene absorption product is diluted with water before the 35% to 45% sulfuric acid recovered from the secondary butyl alcohol is added thereto.

10. In a process of producing isopropyl alcohol and at least one higher secondary alcohol from the corresponding olefins by separately absorbing propylene and a higher secondary olefin in strong polybasic inorganic acid, separately hydrolyzing the resulting alkyl esters and recovering the secondary alcohols thus produced from the acid, the improvement which comprises adding dilute acid of less than 50% concentration recovered from said higher secondary alcohol to the propylene absorption product in an amount sufficient to supply at least 30% of the water applied in the hydrolysis thereof, effecting partial hydrolysis of isopropyl esters in the thus diluted mixture, returning a portion of the partially hydrolyzed mixture to the propylene absorption step, further diluting the remainder of said partially hydrolyzed mixture with water, and completing hydrolysis and recovering isopropyl alcohol from acid of higher concentration than said dilute acid from higher secondary alcohol production.

11. A process in accordance with claim 10 wherein the dilute acid recovered from said higher secondary alcohol has a concentration of about 30% to 45% and is added to the propylene absorption product in an amount sufficient to supply at least 30% of the dilution water used in hydrolyzing the isopropyl esters.

12. A process in accordance with claim 11 wherein normal butylenes are absorbed in sulfuric acid of about 90% to 99% concentration, the propylene is absorbed in sulfuric acid of 60% to 70% concentration, and the dilution of the propylene absorption product is controlled so that residual acid of 60% to 70% concentration is recovered from the isopropyl alcohol and returned to the propylene absorption.

No references cited.